(12) United States Patent
Shantha et al.

(10) Patent No.: US 7,954,900 B2
(45) Date of Patent: Jun. 7, 2011

(54) LEG SUPPORTING DEVICE FOR USE BEHIND A HEAD REST FOR AIR AND VEHICULAR TRAVEL

(76) Inventors: Totada R Shantha, McDonough, GA (US); Usha Shantha Martin, Macon, GA (US); Lauren Asha Shantha, McDonough, GA (US)

(*) Notice: Subject to any disclaimer, the term of this patent is extended or adjusted under 35 U.S.C. 154(b) by 0 days.

(21) Appl. No.: 12/981,512

(22) Filed: Dec. 30, 2010

(65) Prior Publication Data

US 2011/0089725 A1    Apr. 21, 2011

(51) Int. Cl.
*A47C 16/00* (2006.01)
*A47C 7/50* (2006.01)
(52) U.S. Cl. ............ 297/423.4; 297/423.15; 297/DIG. 6
(58) Field of Classification Search ................ 297/423.4, 297/423.39, 423.15, 423.14, 423.1, 188.06, 297/188.05, 466, 423.19, 188.04, 217.3, 297/183.1, 423.12, 423.45, 423.38, DIG. 6; 601/30, 49
See application file for complete search history.

(56) References Cited

U.S. PATENT DOCUMENTS

| | | | |
|---|---|---|---|
| 400,131 A * | 3/1889 | Small ................................. 5/122 |
| 402,130 A * | 4/1889 | Bedford ......................... 297/273 |
| 1,218,876 A * | 3/1917 | Liverson ............................ 5/630 |
| 2,601,488 A * | 6/1952 | Allen .................................... 5/94 |
| 3,580,633 A * | 5/1971 | Du Priest .................... 297/184.1 |
| 5,499,860 A * | 3/1996 | Smith et al. .................... 297/255 |
| 5,556,167 A * | 9/1996 | Johnson Siemion ..... 297/423.15 |
| 5,878,672 A * | 3/1999 | Ostermann et al. ............. 108/44 |
| 6,024,407 A * | 2/2000 | Eakin .......................... 297/217.4 |
| 6,460,925 B1 * | 10/2002 | Kovacs ..................... 297/188.04 |
| 6,554,363 B1 * | 4/2003 | Silva ............................. 297/397 |
| 7,322,655 B1 * | 1/2008 | Williams et al. .......... 297/423.15 |
| 7,448,688 B2 * | 11/2008 | Farah ........................ 297/423.39 |
| 7,658,153 B1 * | 2/2010 | Patoka ............................ 108/44 |

* cited by examiner

*Primary Examiner* — Milton Nelson, Jr.
(74) *Attorney, Agent, or Firm* — Patwrite LLC; Mark David Torche

(57) ABSTRACT

A leg supporting device for use behind a head rest for air and vehicular travel has a head rest support portion that fits over a head rest of a forwardly positioned seat and supports a back flap portion that hangs down behind the forwardly positioned seat. A pair of adjustment straps adjustably attach to the back flap portion and supports a foot support portion. A user slips one or both of their feet into the foot support portion and then adjusts the adjustment straps to support their feet at a desired height and position. The foot support portion handles to carry it. In use, the leg supporting device can be folded and placed within the foot support portion and carried using the handles until needed. One embodiment includes pockets for holding drinks, computer, and other carry-on items. A leg massage unit may be built in for additional relief.

13 Claims, 9 Drawing Sheets

LEG SUPPORTING DEVICE FOR USE BEHIND A HEAD REST FOR AIR AND VEHICULAR TRAVEL

BACKGROUND OF THE INVENTION

Long distance travel by air and motor vehicle as a passenger without exercise and movement of the leg is associated with serious health risks. They are related to lower extremities which are the dependent lowest part of the body during these travels. Gravity and lack of exercise or movement of dependent legs during long air travel and vehicular travel are associated with ankle edema, venous blood pooling in dependent legs, deep vein thrombosis (DVT) of the leg veins, and pulmonary emboli (PE) if thrombus is dislodged from the leg vein, which can threaten the life.

All over the world especially in US, commercial air travel is one of the safest, reliable, dependable methods of transportation; short and long distances from one place to another. Millions of people of all ages take to the air every day. Due to super highways, the long travel in automobiles, passenger buses, SUVs, and recreation vehicles, traveling is part of our lives without breaking to exercise the leg and where the leg rests on the floor of the vehicle with untold discomfort to the passenger and with the leg swelling with or without deep vein thrombosis.

The environment within the aircraft and seating with hardly any space to move the lower limbs in the cabin may have adverse pathological effects on passengers, especially in the elderly and those with underlying medical problems (Voss M W. Air travel for the chronically ill and elderly. Am Fam Physician 1983; 27: 235-43).

The cramped up, overcrowded, confined, restricted conditions, prolonged immobility (particularly in long-air flights), constant noise and vibration, and intermittent air turbulence may be disturbing to the air (and surface vehicular as well: Bus rides, cars, SUVs and RVs) travelers. It can cause edema of the lower limbs (jet flight leg) which is the commonest complication of air travel; deep vein thrombosis (DVT) ('economy class syndrome') as a result of venous stasis in the dependent leg and Pulmonary Embolism (PE) if the thrombus gets loose and travels to the lungs through the venous highway of our body. There is a detailed review on the "air travel in older people" by James A. Low, Daniel K, Y. Chan in Age and Ageing 2002; 31: 17-22).

Physiological Effects of the Air Cabin on the Traveler

Air plane cabin pressure varies according to the altitude. Most commercial planes travel between 28,000 and 45,000 feet (flight altitude) above sea level with cabin pressures maintained between the equivalents of 6000 to 8000 feet (cabin altitude) above sea level. Cabin oxygen starts decreasing at altitude above 22,500 feet. At a cabin pressure of 6,000 feet, the alveolar oxygen tension is 71 mm Hg while at 8,000 feet it is 59 mm Hg (AMA Commission on Emergency Medical Services. Medical aspects of transportation aboard commercial aircraft. J Am Med Assoc. 1982; 247: 1007-11). At cruising altitude, cabin oxygenation is diminished and may pose a health risk to passengers with anemia, cardiopulmonary illnesses, emphysema, COPD, and other vascular conditions. This can result in carbon dioxide build up and acid metabolites accumulation due hypoxic metabolism (lactic acidosis) in the body further contributing to the pathology of leg edema and DVT.

Further, the low cabin pressure leads to expansion of gases in accordance with Boyle's law. If gas is trapped in body cavities such as the sinuses, middle ear, gut, pleural cavity, emphysematous bullae, eyes, tooth fillings, and skull, this can be hazardous to health due to difficulty equalizing air pressures within these enclosed areas of the body with the external environment. It can cause aerotitis media, barosinusitis, aerodontalgia, pneumothorax, transient ischemic attacks, nausea, and vomiting.

The air in the cabin has low humidity. The low humidity (usually below 25%) within the cabin may lead to dryness of exposed membranes (oropharynx and eye), which leads to dehydration, if the traveler is on a diuretic and the ingestion of many alcoholic drinks during the flight.

The overcrowded, confined, restricted conditions, prolonged immobility in long flights and surface travel, constant noise, and vibration of the plane; and intermittent air turbulence due to weather and altitude changes may be disturbing to travelers specially if the person is elderly (Rayman R E. Passenger safety, health and comfort: a review. Aviation Space Environ. Med. 1997; 68: 432-40). To top it all, prolonged air travel can cause edema of the lower limbs (jet flight leg) (Shuster S. Jet flight leg. Lancet 1996; 347: 832-3. James P B. 'Jet leg', pulmonary embolism and hypoxia. Lancet 1996; 347: 1697.), or deep vein thrombosis ('economy class syndrome') (Cruickshank J M, Gorlin R, Jennett B. Air travel and thrombotic episodes: the economy class syndrome. Lancet 1988; ii: 497-8.), as a result of venous stasis due to lack of leg muscle exercise which literally pumps blood towards the heart during contraction in the unidirectional valves of the leg veins.

Pulmonary embolism is now a well-recognized complication of long-haul air travel (Black J. Deep vein thrombosis and pulmonary embolism. Lancet 1993; 342: 352-3. Milne R. Venous thromboembolism and travel: is there an association. J R Coll Physicians Lond 1992; 1: 47-9. Lederman J A, Keshavarzian A. Acute pulmonary embolism following air travel. Postgrad Med J 1983; 59: 104-5).

A study of 56 victims of pulmonary embolism at Charles de Gaulle Airport found a direct correlation between the distance traveled and the likelihood of PE. About 85% of air travel thrombosis victims (DVT) are athletic, usually endurance-type athletes like marathoners. People with slower resting blood flow are at greater risk of stasis, stagnant blood subject to clotting. Also, they are more likely to have bruises and sore muscles during their athletic activities that can trigger clotting in the stagnated blood in the blood vessels of the lower extremities. It is estimated that chances of blood clotting in the leg veins is fifty times more in fliers compared to non-flying population.

Development of acute ischemia due to arterial thrombosis of the lower limbs from prolonged sitting is one the complications cannot be ignored (Teenan R P, McKay A J. Peripheral arterial thrombosis related to commercial airline flights. Br J Clin Pract 1992; 46: 165-166).

Hypoxia during flying can induce ischemic conditions of the heart, leading to acute myocardial infarction or stroke, or change in cognition. Older people may suffer the harmful effects of prolonged hypoxia without presenting overtly initially. The cardiac consequences of in-flight hypoxia include angina, acute myocardial infarction, and congestive cardiac failure (Anon. Illness in the clouds (editorial). Br Med J 1975; 1: 295). Cardiac conditions constitute the most common cause of in-flight deaths (Cummins R O, Chapman P J C, Chamberlain D A el al. In-Air flight deaths during commercial air travel. J Am Med Assoc. 1988; 258: 1983-8.).

PE deaths each year are numbered about 200,000. Several studies, such as a 4-year study at Tripler Army Medical Center in Hawaii, have concluded that 50% of DVT/PE cases are attributable to air travel. Of 200,000 PE deaths the 50% are due to air travel would be 100,000. This is a conservative estimate because it doesn't include stroke and heart attack deaths caused by air travel DVT. About 48% DVT victims later develop so called Postthromoteic syndrome (PTS) resulting in swelling and pain of the lower leg. Due to these lingering health risks due to air travel, precautions should be taken to prevent the leg swelling, and venous stasis in leg veins.

One of the most common in-flight medical emergencies is syncope (fainting fit) from a variety of causes (Cottrell J, Callaghan J, Kohn G el al. In-flight emergencies: one year of experience with the enhanced medical kit. J Am Med Assoc 1989; 262: 1653-6. Donaldson E, Pearn J. First aid in the air. Aust N Z J Med 1996; 66: 431-4. Schoken V, Lederer L. Unscheduled landings for medical reasons: a five year survey of the experience at American Airlines. In Busby D edited. Recent Advances in Aerospace Medicine. Dordrecht: Reidel, 1970; 126-9.).

Aircraft passengers, especially elderly travelers, are more prone to syncope because of prolonged sitting with pooling of the blood in dependent leg, dehydration and alcohol use if there is any which can lead to postural hypotension and syncope (Jagoda A, Pietrzak M. Medical emergencies in commercial air travel. Emerg Med Clin North Am 1997; 15: 251-60).

Economy Class Syndrome and Jet Leg Syndrome

The term 'economy class syndrome' refers to the development of deep vein thrombosis with subsequent pulmonary embolism in passengers travelling long distances in the cramped economy class seats. Unfortunately, the business class and first class travelers, pilots and air hostesses are not exempt from these risks. This term can be applied to the long distance bus rides, SUV, and car travel.

Those with predisposing medical conditions such as venous system disease (Varicose veins), advanced cancers, heart failure, atrial fibrillation, nephrotic syndrome, abnormally high hemoglobin (hematocrit) levels, hemochromatosis, liver cirrhosis, high platelet levels, leukemia, hypercoagulable disorders, women on hormonal therapy, history of recent surgery, and those with a history of thrombo-embolic illnesses are at a risk of developing this complication (Symington I A, Stack BHR. Pulmonary thromboembolism after travel. Br J Dis Chest 1977; 71: 138-40. Sarvesvaran R. Sudden natural deaths associated with commercial air travel. Med Sci Law 1986; 26: 35-8. Thomas J E P, Abson C P, Cairns N J W Pulmonary embolism: a hazard of air travel. Centr Afr J Med 1981; 27: 85-7).

Dependent leg with edema, pooling of venous blood in the legs, and DVT can result in pulmonary embolism (PE) due to air travel and journeys as short as 4 hours. DVT may present 1-2 weeks after the flight or long vehicular travel and is not necessarily preceded by a pain in the calf. Preventive Measures suggested include the use of pressure-graded elastic stockings (not elastic panty hose, they won't help), periodic muscle contracting exercises while seated using our invention, regular walks from the aisle seat (avoiding the window seat if possible), restrict excessive alcohol intake, and adequate (non-alcoholic) electrolyte fluid intake (Landgraff A. Economy class syndrome: theology, balance and lower leg edema during a simulated 12 hour long distance flight. Aviat Space Environ Med 1994; 65: 930-5).

Travelers with predisposing conditions who are at a high risk for thrombo-embolism; low-molecular-weight heparins, warfarin or low-dose aspirin may be taken prophylactically (The Pulmonary Embolism Prevention (PEP) (Trial Investigators. Prevention of pulmonary embolism and deep vein thrombosis with low dose aspirin. Lancet 2000; 355: 1295-302. Kay S. Safe air travel. Preventing in-flight medical problems. Nursing Pract 1994; 19: 43-6.). Leg edema ('Jet flight leg'), may mimic deep vein thrombosis, is more common in women, usually benign, resolves spontaneously and can be prevented by the use of appropriate elastic stockings, which should be worn before take-off to be effective as soon as you are seated in the plane and using our invention. They can be worn during long bus, car, and other vehicular rides also.

Air Cabin Effects on Body Gases of Passenger

The expansion of body gases within the low-pressure environment of the aircraft cabin can cause serious harm to health. Expansion of gases within the stomach and duodenum may lead to pain, discomfort, nausea, vomiting, splinting of the diaphragm, breathing difficulties, and even intestinal perforations. Hence, avoid gas-producing foods before travel and carbonated drinks during the flight. Those with recent abdominal (gastrointestinal and urological) surgery, gastrointestinal hemorrhage, or bowel obstruction should refrain from flying till health is restored (2-3 weeks after the event). For those with a colostomy, a larger bag should be used and carry a spare bag to the cabin. The trapped air in defective teeth fillings, apical abscesses and carious teeth can expand to cause toothache (aerodontalgia).

Cardiac conditions constitute the most common cause of in-flight deaths (Cummins R O, Chapman P J C, Chamberlain D A el al. In-Air flight deaths during commercial air travel. J Am Med Assoc 1988; 258: 1983-8.). Air travel should be avoided in those with new or unstable angina, history of recent myocardial infarct (within 3 months), poorly controlled congestive heart failure, malignant hypertension or severe anemia<8 g/dl), advanced COPD, severe lung fibrosis and cardiac asthenia.

Ear and Sinus Problems During Air Travel

Ear and sinus problems are the recurring complaints of the travelers during ascent and descent of the air plane. Earache can be serious and annoying in toddlers (crying due to pain). Otic barotrauma occurs in up to 9% of air travelers. It can present as acute ear pain, tinnitus, vertigo, or temporary hearing loss (Csortan E, Jones J, Haan M Brown M. Efficacy of pseudoephedrine for the prevention of barotraumas during air travel. Ann Emerg Med 1994; 23: 1324-7.).

Cabin pressure changes can be deleterious to passengers with middle ear and sinus problems. Failure to equalize pressure within the middle ear and the environment can cause otic barotrauma and potentially even tympanic membrane rupture with slight bleeding to external ear canal. A patent Eustachian tube is of paramount importance in equilibrating middle-ear pressure with the external environment. Individuals with acute otitis media, Eustachian blockage, and severe sinus problems; recently eye or brain surgery, lung surgery or laparoscopic procedures are advised not to fly until the conditions are cleared. Passengers are advised to perform a Valsalva maneuver or to swallow repeatedly to prevent damage to the ear drum and open up the connection to the middle ear through the Eustachian tube.

Neurological Conditions and Effects of Air Travel

Seizures patients should be on medications and patients who have had strokes, after brain surgery or concussion within 4 weeks of occurrence should not travel to prevent further brain swelling and or recurrence during flight. Passengers (especially aged), due to prolonged sitting, dehydration and alcohol use, can lead to postural hypotension and develop Syncope (fainting).

Motion Sickness of Air Travelers

Air turbulence due to a linear vertical motion (during take-off and landing descent) on the vestibular organ, psychological factors, and alcohol consumption can cause motion sickness, which can be incapacitating. Measures that can be used to reduce this problem include flying at night to reduce visual stimulation, sitting in a reclining position, seated away from the engines and toward the center of gravity of the aircraft, and taking prophylactic anti-motion medication during the flight such as anti-histamines and scopolamine patches.

Precautions for the Older Air Traveler

Due to aging of the population, the increased old age group travelling is increasing with resulting in multiple health-related medical emergencies in flight. In-flight medical emergencies can be reduced or averted with careful pre-flight planning and medical evaluation of those with many medical problems who are on multiple medications, those recently discharged from hospital, those with advanced chronic illness (such as heart failure or chronic airflow limitation) and those who are frail (Gong H Jr, Lee J A, Cowan M N.

Pre-flight medical screenings of patients. Analysis of health and flight characteristics. Chest 1993; 104: 788-94). All passengers over 65 who intend to fly for more than 6 hour should be screened for any health problems as a precautionary measure. Screening of patients susceptible to the adverse effects of hypoxia might include arterial blood gasses, an electrocardiogram, lung function tests, and measurement of serum hemoglobin concentration. All elderly people with memory or cognitive deficits are screened with the Mini-Mental State Examination. Those with early dementia may be more prone to developing delirium in flight.

The physician who deals with older patients should be able to offer advice, counseling, and screen those who are at risk and advice against travelling in certain situations (Table 1). Some recommendations are given in Table 2 if one has to travel.

There is a detailed review on the "air travel in older people" by JAMES A. Low, DANIEL K, Y. CHAN in Age and Ageing 2002; 31: 17-22; and has information for those who have to travel on long distance bus rides, recreation vehicles, SUV, and cars. The following tables are modified from this publication which acts as helpful guide lines for safe trip and to prevent leg swelling and deep vein thrombosis associated pulmonary emboli. Table I and Table II describe the health related contraindications and precautions to be taken if the travel is planned by the aged.

TABLE I

Contraindications to long-distance air travel specially for the aged

CARDIOVASCULAR SYSTEM

1. Heart attack within last 3 months
2. Chest pain due to unstable angina
3. Heart disease with uncontrolled congestive cardiac failure
4. Uninhibited cardiac dysrhythmias
5. and very high blood pressure (Malignant hypertension)

RESPIRATORY SYSTEM

1. Air between the chest wall and lungs (pneumothorax)
2. Severe Emphysema with bullous (Air bubble pockets) disease
3. Vital capacity of <50%
4. Arterial P02 of <60 mmHg with oxygen at ground level

NEUROPSYCHIATRIC DISORDERS 1. stroke within last 4 weeks on anti-coagulants
2. Epilepsy - uncontrolled
3. Severe dementia with delirium

OTHERS HEALTH CONDITIONS

1. Severe anemia <8 g/dl
2. Recent eye, abdominal or brain surgery (within last 2 weeks)
3. Serious sinus and middle ear infection

TABLE 2

Recommendations for air travel specially to the aged

BEFORE THE TRIP PREPARATIONS

1. Start preparations early - one to two weeks ahead
2. Consider travelling with family and groups
3. Foreign travel should include appropriate vaccinations
4. Take out adequate travel health and life insurance
5. Those with cardiopulmonary conditions, recent acute medical
6. Ask your doctor to prescribe anxiolytics for anxiety and antihistamines for motion sickness to be taken before the Right
7. Involve in exercise program such as walking, swimming, cycling, tread mill etc.

DURING THE FLIGHT OBSERVATIONS

1. Carry physical health aids
2. Carry medications in separate bag packed for easy accesses
3. If old, try to be seated along the aisle, away from the engines
4. Do not drink alcohol
5. Avoid gas-producing food such as beans you already know.
6. Avoid plain water, colas and drink electrolytes (Gatorade) containing fluids throughout the flight
7. Stop smoking a week or two ahead if you are habitual smoker
8. Once seated, take regular walks in the aisle and engage in leg muscle contracting movement exercises If a blood clot dislodges from the leg veins due to movement of the leg after air flight and vehicular travel trek to the lung, which can cause pain, fainting, and even death. A clot in the leg is called deep vein thrombosis (DVT) and a clot in the lung is called pulmonary embolism (PE). Clots form in the arterial system and in the heart, leading to heart failure, and stroke about 2-3 weeks after travel.

DVT is usually mistaken for a cramp. Correct diagnosis and treatment is usually delayed which aggravates the injury and increases the risk of permanent vein damage and further injury or death when a clot travels to the lungs, brain, or heart. Airhealth.org says, "About 85 percent of air travel thrombosis victims are athletic, usually endurance-type athletes like marathoners. People with slower resting blood flow are at greater risk of stasis, stagnant blood subject to clotting. They are more likely to have bruises and sore muscles that can trigger clotting. Long bus and vehicular riders are not immune from this medical complication.

During air travel, blood coagulability (blood clotting) rises steadily and blood flow slows down, especially in the lower dependent part of the legs. Most of these clots are painless which some clots do cause pain and swelling. Blood clotting factors during a 9 hour flight (or vehicular rides) show noteworthy changes in blood chemistry.

Coagulation involves a complicated interplay between factors that produce fibrin versus factors that dissolve fibrin. DVT may appear during flight and vehicular travel or in the next few days. After 30 days you are probably safe. Watch for the following leg symptoms: 1. A little swelling in both leg is normal in flight but a sudden swelling in one lower leg is dangerous; 2. Cramp or tenderness in one of the calf muscles; 3. Bruise or swelling behind knee. Suspect PE if one develops the following: 1. Shortness of breath, 2. Rapid breathing, 3. Cramp in the side of chest wall, chest pain, sometimes accompanied by shoulder pain, painful breathing, 4. Fever, 5. Coughing up blood 6. Fainting (especially in older people).

Aspirin and clopidogrel (Plavix), are effective for arterial clotting and aggregation of platelets. They are not as effective for venous pooling and clotting. Low molecular weight heparin (Lovenox and Pinokinase) a new pharmacologic compounds effectively prevents blood clots during air travel.

Preventive Measures for Leg Swelling, DVT and PE

Frequent leg flexing and movement with contraction of the all the leg muscles is the best preventive for Air and long surface travels. The blood needs to be pressed through the one-way valve veins system by contractions of the thigh and calf muscle every 30 minutes and more often if you have RISK FACTORS.

Exercises:

1. Extend your leg and flex your ankles, pulling up and spreading your toes, then pushing down and curling the toes. If your shoes limit toe movement, make the effort and don't worry, or remove the shoes. Alternative: rotate the ankles, making circles in the air with your toes.

2. If there isn't room to extend your leg, start with your feet flat on the floor and push down and curl your toes while lifting your heels from the floor. Then, with your heels back on the floor, lift and spread your toes. Repeat this heel-toe cycle five times or more.

3. Exercise your thigh muscles by sitting with your feet flat on the floor and slide your feet forward a few inches, then slide back and repeat and extend the leg (if you have enough room), and isometrically flex thigh muscles.

Compression Stockings: Compression stockings have proven effective in controlled studies. Studies using ultrasound scans before and after air travel found 5% of air travelers without stockings developed clots. Matched groups wearing compression stockings did not develop clots. Compression stockings are not recommended for people with poor leg circulation caused by arterial insufficiency. Avoid elasticity along the entire length elastic "support" hose and use special graduated compression stockings which are tight at the ankle. The compression stockings helps keep fluids in circulation instead of collecting in the lower leg, causing the swelling that can make it difficult to get your shoes back on after a flight.

Hydration: In a study by Hamada, twenty test subjects drank plenty of water, one cup per hour, during a nine-hour flight. They developed significant increases in blood thickness and urine output. Blood samples from arms and lower leg were taken. Viscosity (thickness) increased in the lower leg, exactly where clots are likely to form. Twenty other people drinking an electrolytic beverage did not have increased blood viscosity and urine output.

According to Medline Plus "Electrolytes exist in the blood like acids, bases, and salts (such as sodium, calcium, potassium, chlorine, magnesium, and bicarbonate) and can be measured by laboratory studies of the blood serum." Glucose is a carbohydrate; not an electrolyte. Apparently drinking an electrolytic beverage is a much better choice for staying hydrated during air travel (Hamada, Koichiro et al—Effects of Hydration on Fluid Balance and Lower-Extremity Blood Viscosity during Long Airplane Flights. JAMA. 2002; 287:844-845. February 20). Airlines don't serve electrolytic beverages which you may have to bring your own. Drink one cup per hour, for an eight-hour flight you need 64 ounces.

Tips to Reduce Lower-leg Swelling during Travel

1. Prevent wearing tight stretched, unyielding, skin-tight.
2. Drink adequate fluid to keep your urine light in color.
3. Include an isotonic drink such as Gatorade, Snapple etc. Isotonic means a solution that has the same salt concentration as the normal cells of the body and the blood as opposed to a hypertonic solution or a hypotonic solution.
4. Attempt to move your leg and stretch your ankles every 30 minutes by a short walk if possible or moving the leg while sitting. Draw circles with your toes to rotate your ankles if you are stuck in one position and cannot walk.

5. Elevate your feet and leg when possible. This is where our inventions play a major role in preventing the leg swelling and its associated complications such as DVT, and pulmonary emboli. You can elevate the leg any level you want using the present invention during any long travel.

6. Stay away from alcohol and sedatives because they both promote inactivity.

7. Consider wearing proper compression stockings. Do not confuse compression stockings with support stockings.

8. Avoid sleeping with crossed leg on the seat.

Many, who travel regularly, do not take the above precautions. We made a survey and observation at the airport and bus ports, which we found hardly anyone wearing compression stockings or taking any other measures enumerated here. Drinking alcohol was common in the first and business class. Only one time, we found a lady exercising her body from head to toe in the economy class. Majority of the people who walked out after flying had swelling of the ankles especially the elderly and females. Many of them had difficulty in walking (limping) due to increased tightness of the shoes at the ankle and leg due to swelling.

There is a need for an device that positions and suspends the leg above the floor in a vehicle passenger seat that is positioned behind a head rest to allow free movements of the leg (i.e. muscle contractions) that are bent at the hip, knee, and ankle resulting in prevention of venous blood pooling responsible edema and for deep vein thrombosis.

SUMMARY OF THE INVENTION

A leg supporting device for use behind a head rest for air and vehicular travel has a head rest support portion that fits over a head rest of a forwardly positioned seat and supports a back flap portion that hangs down behind the forwardly positioned seat. A pair of adjustment straps adjustably attach to the back flap portion and supports a foot support portion. A user slips one or both of their feet into the foot support portion and then adjusts the adjustment straps to support their feet at a desired height and position. The foot support portion handles to carry it. In use, the leg supporting device can be folded and placed within the foot support portion and carried using the handles until needed. One embodiment includes pockets for holding drinks, computer, and other carry-on items. A leg massage unit may be built in for additional relief.

Other features and advantages of the instant invention will become apparent from the following description of the invention which refers to the accompanying drawings.

BRIEF DESCRIPTION OF THE DRAWINGS

FIG. 8 is a side view of the leg supporting device for use behind the headrest-equipped seat having a vibrator built in.

DETAILED DESCRIPTION OF THE INVENTION

Figure 1:
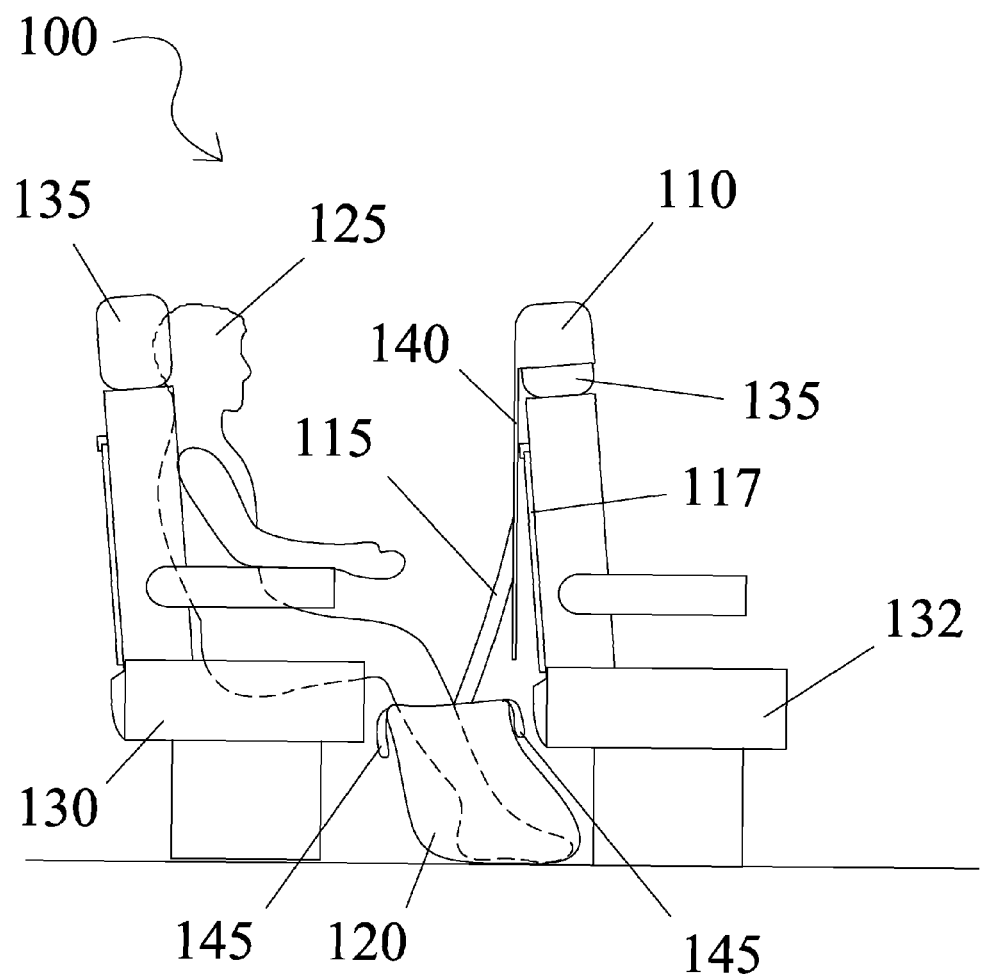
FIG. 1 is a side-view diagram of a leg supporting device for use behind a head rest equipped seat according to an embodiment of the invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

As shown in the drawings for purposes of illustration, the present invention relates to a leg supporting device for use behind a headrest equipped seat comprising a leg suspension support bag to be floating from the front seat headrest to suspend and swing leg from the floor to allow free movement of the legs to exercise for preventing foot, ankle, leg swelling, and venous blood clotting common in air travel and long surface vehicular travel of the back seat passenger. Such long static stationary travel result in pooling of the venous blood in the leg veins can lead to DVT and PE with associated morbidity and mortality.

Referring now to FIG. 1, a leg supporting device for use behind a head rest equipped seat 100 has a head rest support portion 110 which fits over a head rest 135 of a front seat 132 to be used during travel. A back flap portion 140 is attached to head rest support portion 110 and a pair of adjustment straps 115 connect a foot support portion 120. Foot support portion has a pair of handles 145 used to carry leg supporting device 100 when not in use. A user 125 positions their leg or legs inside foot supporting portion 120 before or after adjusting adjustment straps 115 to select a desired position and height above the floor while sitting in a rear seat 130. In use, the height and position may be changed as desired by moving adjustment straps 115.

Figure 2:
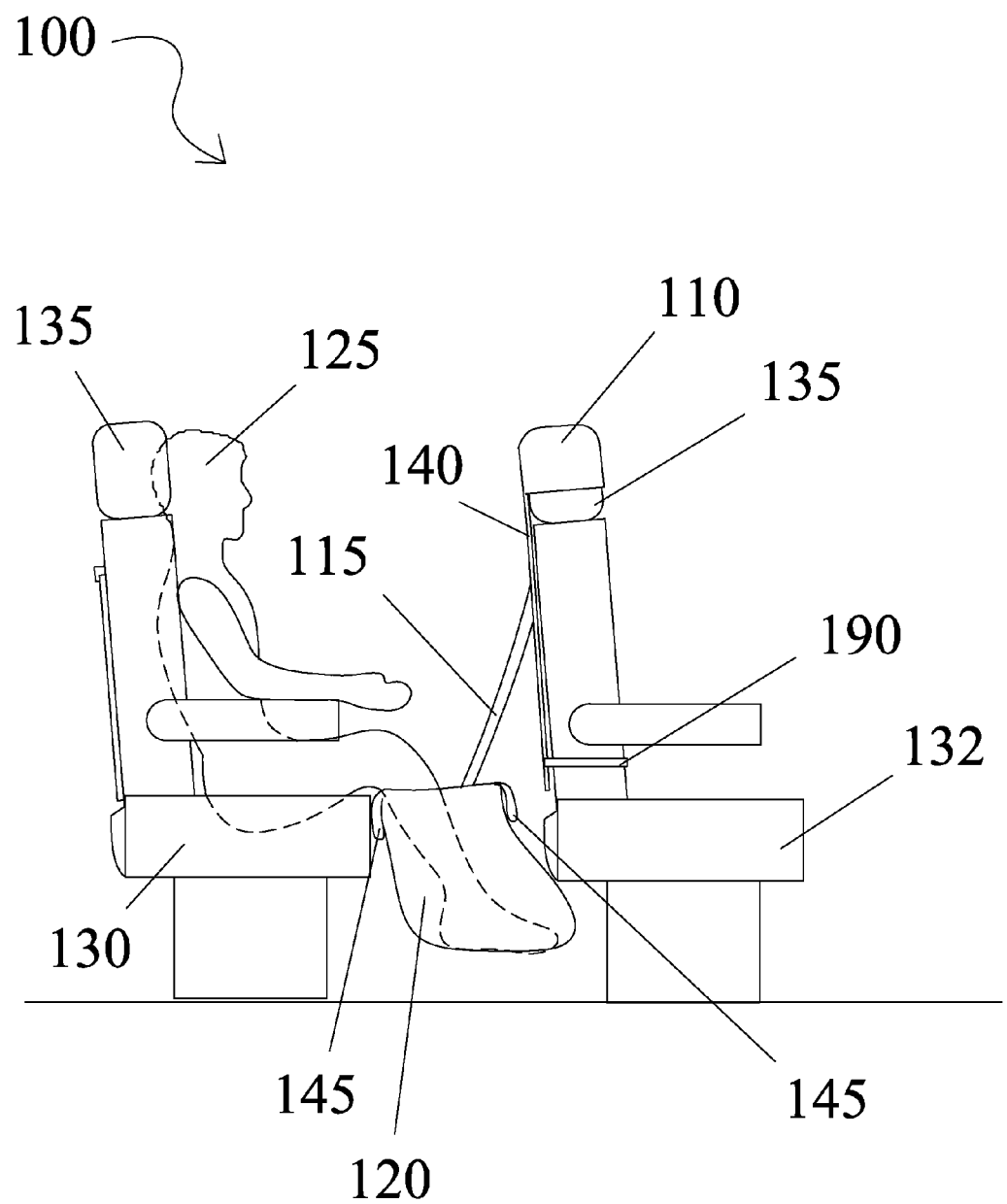
FIG. 2 is a side-view diagram of the leg supporting device for use behind the head rest equipped seat shown in FIG. 1 depicting the suspension bag in use during travel with leg above the floor.
Figure 3:
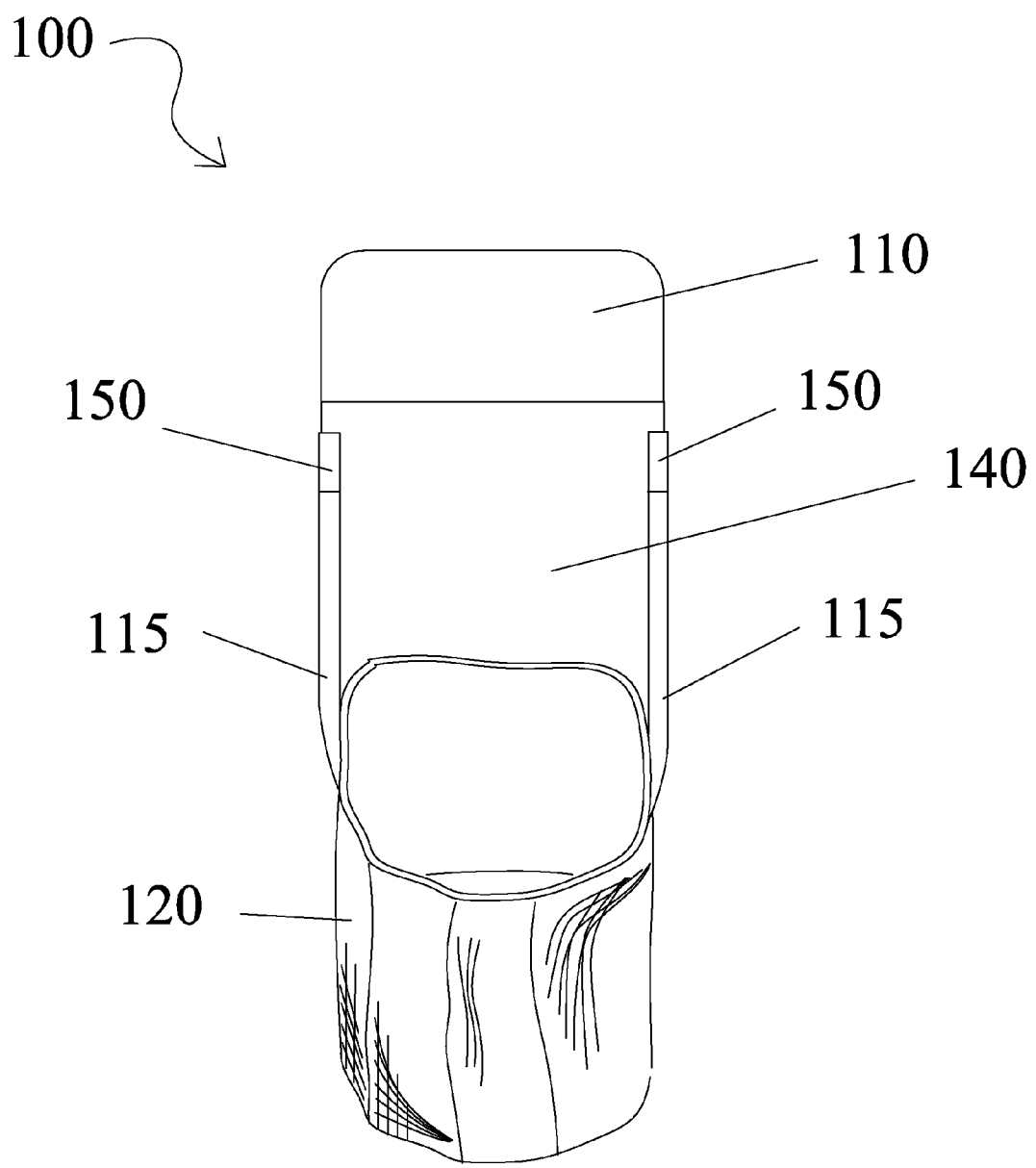
FIG. 3 is a front view of the leg supporting device for use behind the headrest-equipped seat shown in FIG. 1.

Referring now to FIGS. 2 and 3, leg supporting device for use behind a head rest equipped seat 100 is shown adjusted to support user's legs 125 above the floor of the vehicle. Adjustment straps 115 swing out from back flap 140 to hold user's legs 125 in a selected position. Foot support portion 120 can be positioned before the leg is placed inside for suspension away from the ground. Note that foot support portion 120 bends the leg at the ankle, knees, hip which allow free movement within foot support portion 120. A pair of hook and loop fasteners 150 are used to attach adjustment straps 115 to back flap portion 140. This firmly supports foot support portion 120 without inconveniencing travelers in front seat 132 during use. Although hook and loop fasteners 150 are shown, other adjustable means for adjusting the height of foot support portion 120 may be used such as buckles, snaps, straps, etc. as known in the art as long as user 125 is able to adjust the height.

Figure 4:
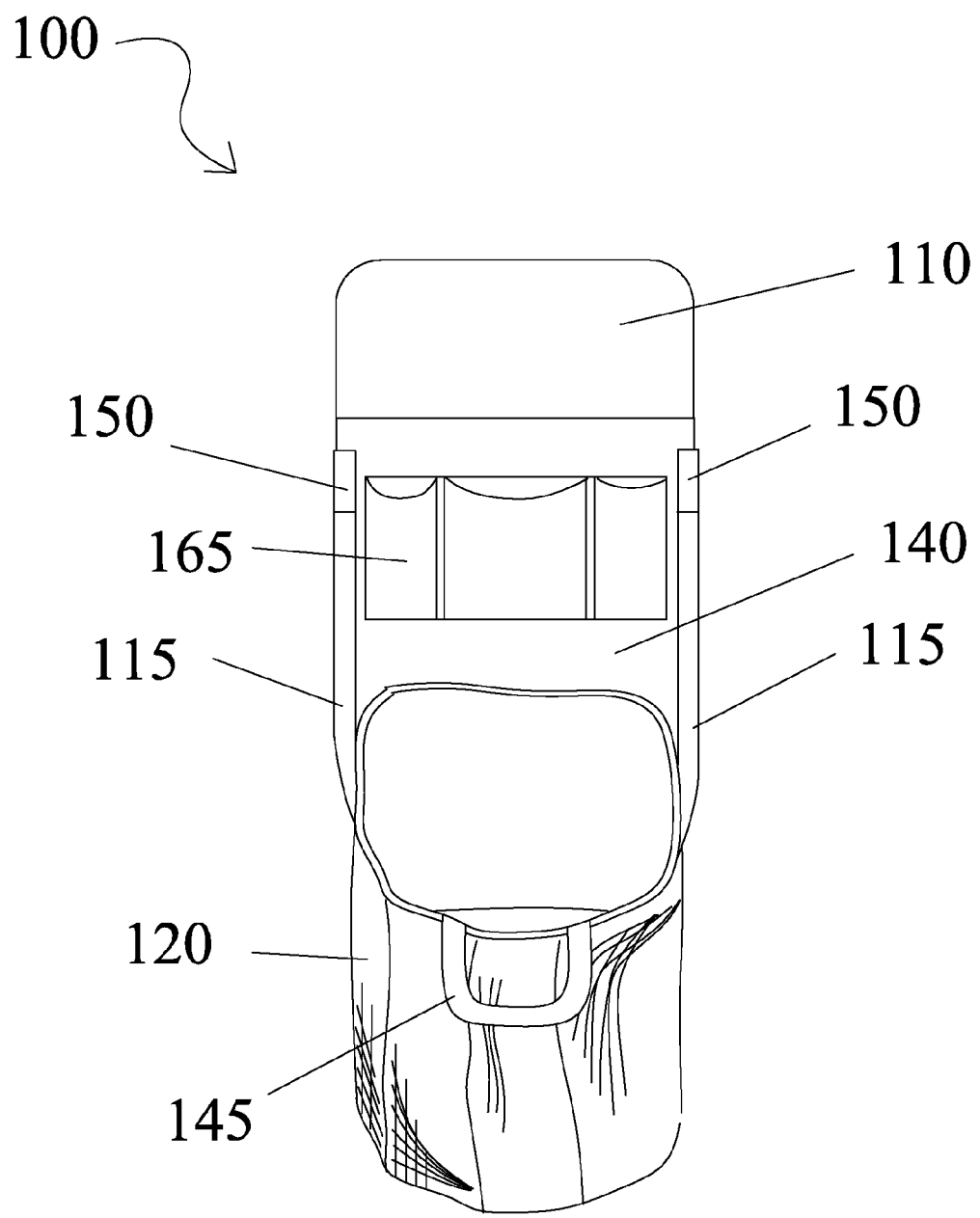
FIG. 4 is a front view of the leg supporting device for use behind the headrest-equipped seat shown in FIG. 1 with pockets for computer, books, water bottle, pens, etc.

Referring now to FIG. 4, leg supporting device for use behind a head rest equipped seat 100 is shown having various pockets 165 for conveniently holding computers, books, water bottles, pens, etc. Because foot support portion 120 has handles 145, it is also used as a tote bag while traveling to the plane or vehicle and can carry reading material, computer, drinks, blanket, head and neck rests, leg vibrator, hot and cold packs, etc.

Figure 5:
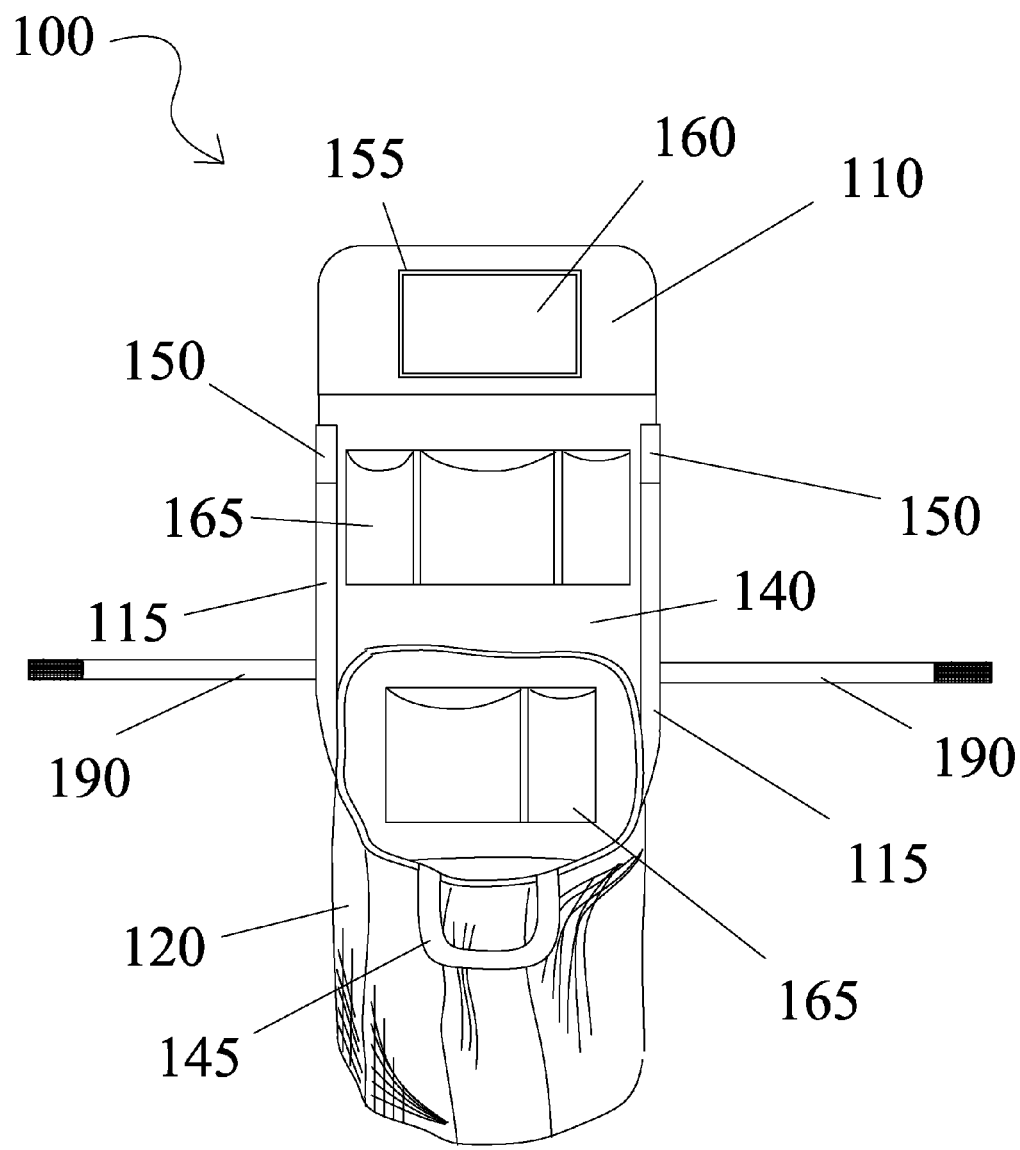
FIG. 5 is a front view of the leg supporting device for use behind the headrest-equipped seat shown in FIG. 1 equipped with video and TV seat showing the provision to view the video screen during travel.
Figure 7:
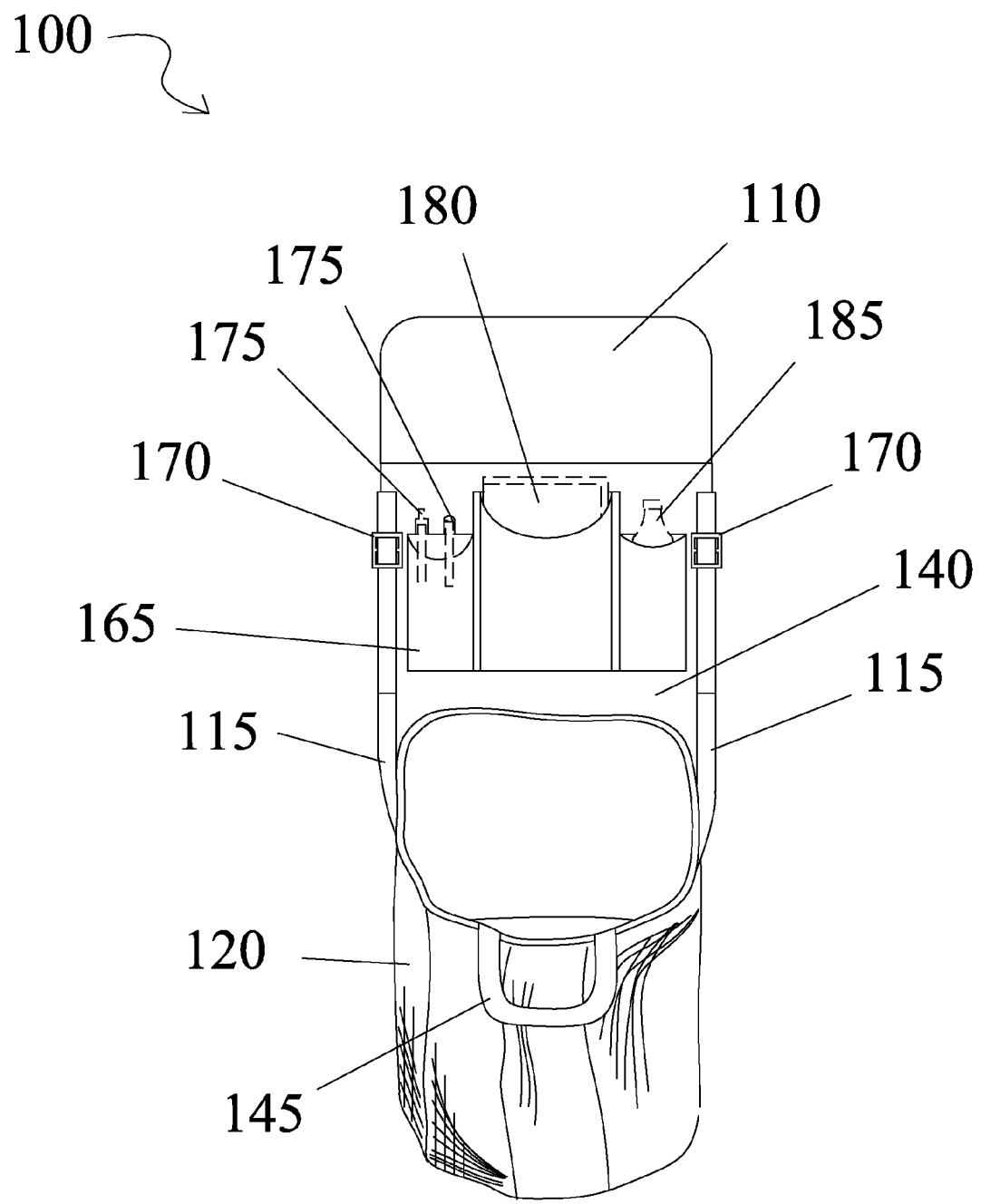
FIG. 7 is a front view of the leg supporting device for use behind the headrest-equipped seat shown in FIG. 1 having pens, water bottle and computer in the pockets.

Referring now to FIGS. 2, 5 and 7, leg supporting device for use behind a head rest equipped seat 100 is shown having an anchor strap 190 which is used to attach it to front seat 132 so as secure back flap 140. In the embodiment shown in FIG. 5, foot support portion 120 also incorporates pockets 165 to hold various things like computers, books, etc. as discussed above. Head rest support portion 110 has a video screen cut out 155 which allows user 125 to watch a built in video screen 160 attached to front seat 132 which is common in plane or vehicle seats. Back flap 140 can be rolled up and down to accommodate a food tray 117 from the back of front seat 132 to accommodate food and drinks served during flight.

Pockets 165 are shown having pens 175 inserted therein. A computer 180 is shown inserted therein and a beverage 185 is also contained which allows user 125 to conveniently contain travel items neatly and accessible during travel.

Figure 6:
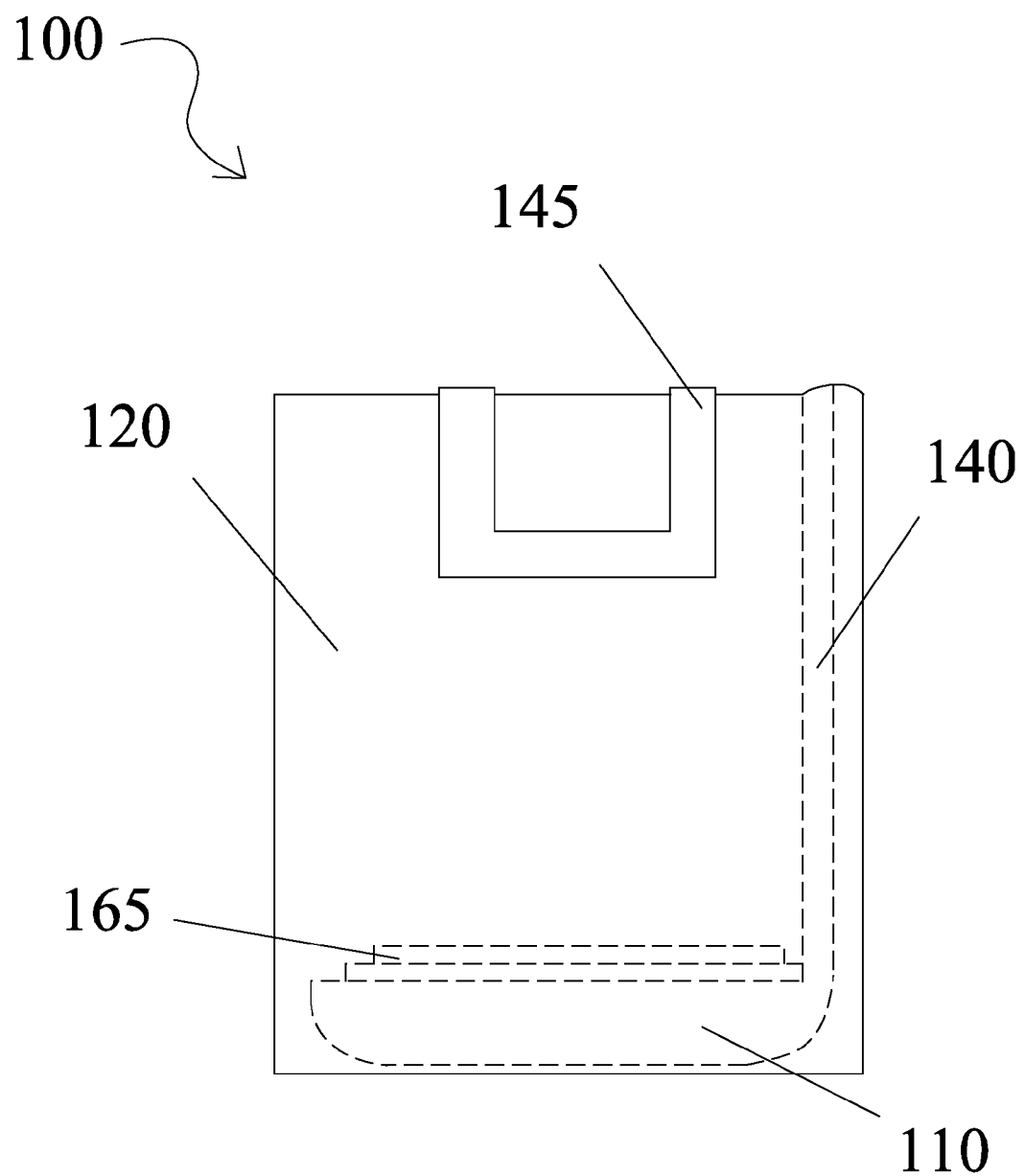
FIG. 6 is a front view of the leg supporting device for use behind the headrest-equipped seat shown in FIG. 1 disassembled and carried as tote bag with other travel supplies.
Figure 8:
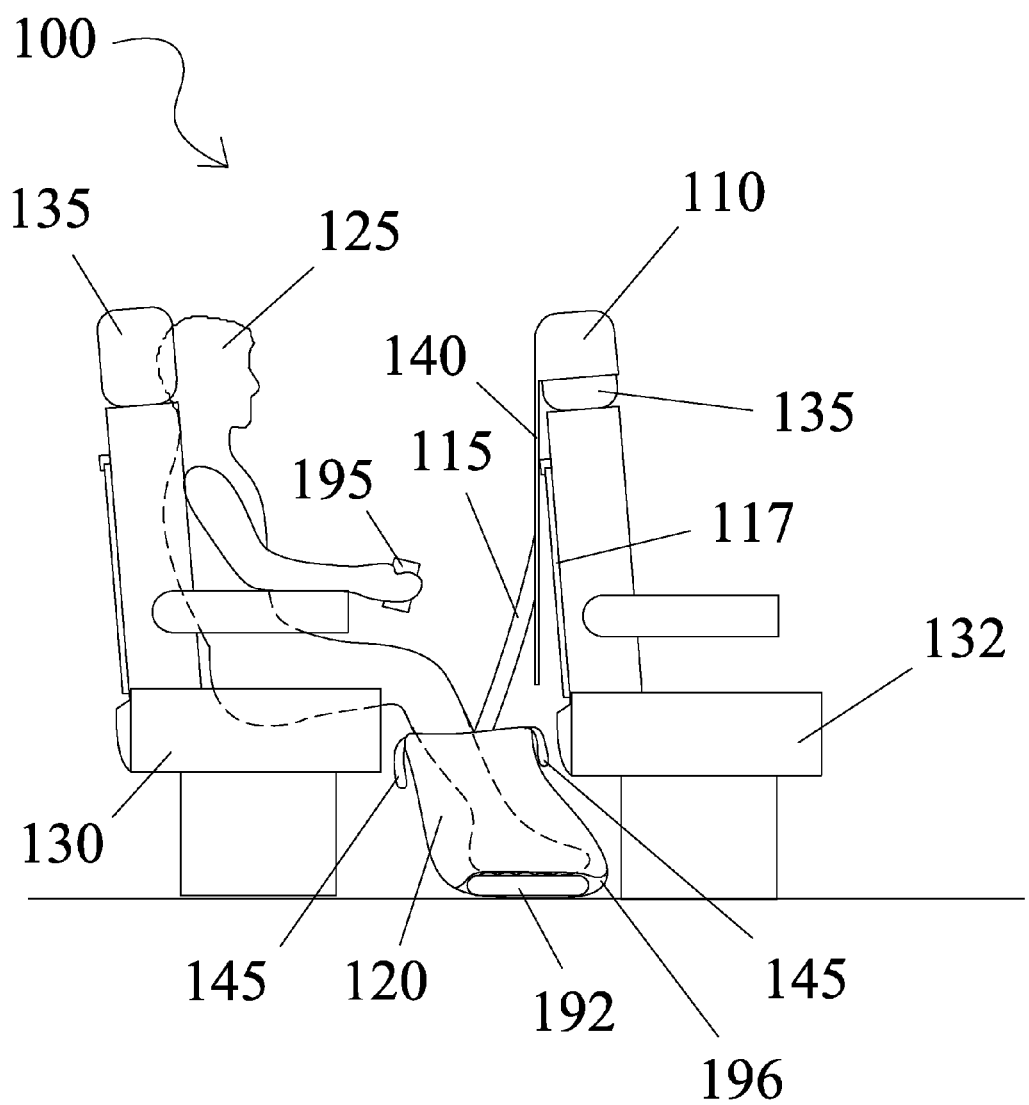

Referring now to FIGS. 6 and 8, leg supporting device for use behind a head rest equipped seat 100 is shown unattached and carried as tote bag 120 with back flap 140 with pockets 165 and head rest support portion 110 contained therein. Also, as shown in FIG. 8, foot support portion 120 may also carry a leg vibrator 192, cooling and heating pad (not shown) as well as other travel supplies. Again as discussed above, handles 145 allow it to be used as tote bag before, during, and after travel or other times.

Referring now to the FIG. 7, is the diagram 100 similar to the one describe in FIG. 5 showing the suspension straps 115 attached to the back flap 140. This embodiment of travel leg suspension support bag also incorporates computer/reading material bag 180 and water and pen bags 165 on the flap 140 and inside the leg suspension bag 120. The leg suspended by use of straps 115 which can be shortened to pull the leg up from the floor of the plane or travel vehicle by adjusting at the buckle 170 like a leather waist belt and Velcro attachment. Leg suspension bag also contains pen and reading material/computer pockets 165 incorporated inside the leg bag 120 as shown in FIG. 5.

Referring now to FIG. 8, leg supporting device for use behind a head rest equipped seat 100 is shown having a massage/vibrator 192 located in a massage/vibrator pocket 196 with a remote control 195. This allows user 125 to activate massage/vibrator 192 during travel to exercise the foot and the leg. This helps user 125 to avoid the swelling of the legs, and venous blood stasis and inhibit the formation of blood clot in the vein.

Figure 9:
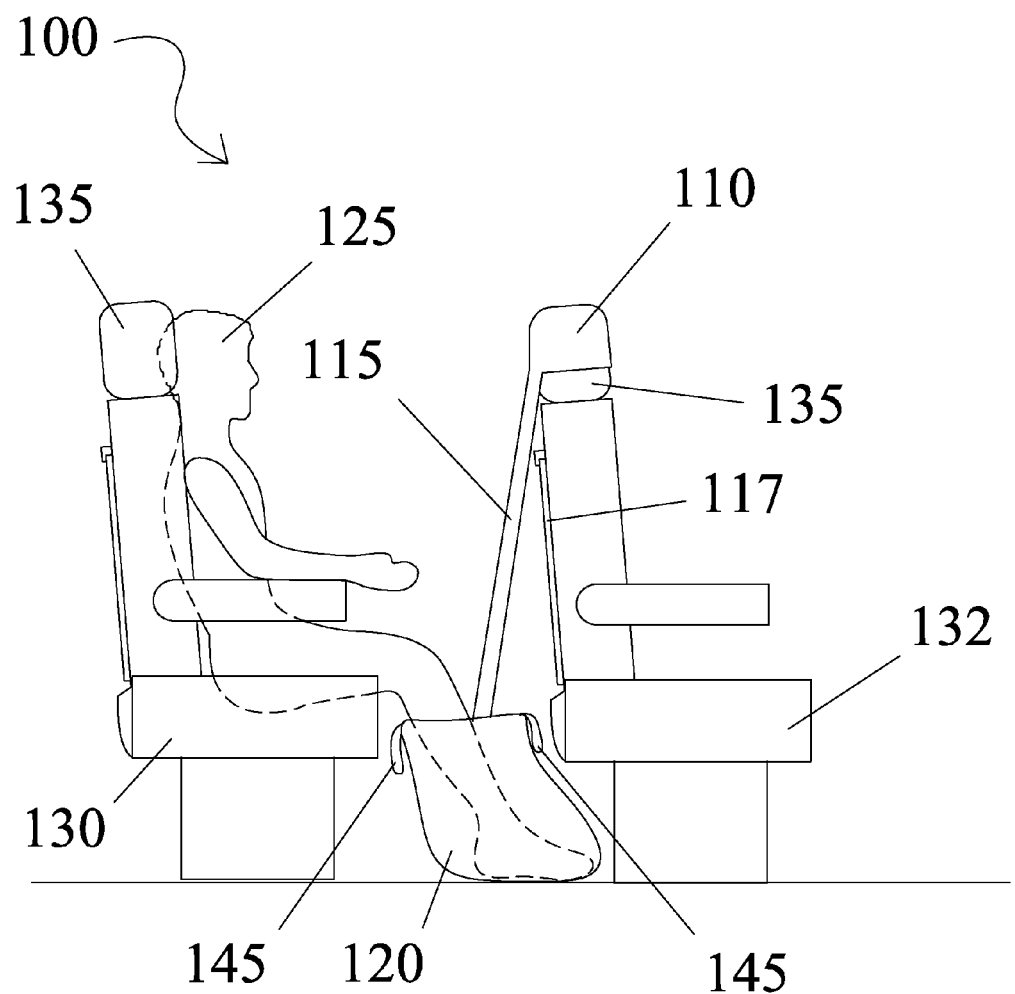
FIG. 9 is a side-view diagram of a leg supporting device for use behind a head rest equipped seat according to an embodiment of the invention.

Now referring to FIG. 9, leg supporting device for use behind a head rest equipped seat 100 is shown having adjustment strap 115 attached to head rest support portion 110 to support foot support portion 120. In use, operation is the same as discussed above.

The travel leg supporting device for use behind a head rest can be attached to the seat headrest of the front seat without inconveniencing the seated passenger in the front seat. It can be used, depending upon whether it is a recreation vehicle or SUV, behind the driver and passenger seats in the front row and next to the passenger in the back seat. Then the upper pocket can be used for placing drinks, carrying the computer, reading material, and the foot pocket can used to carry food and other objects needing access to the driver and the passenger.

Once the passenger is seated, this travel leg suspension support bag is immediately attached to the top of the heard rest of the front seat and suspended as shown in FIG. 1. After securing it firmly to the front seat with anchor strap 190, user's legs 125 are positioned in foot support portion 120. Next, user 125 lifts leg to desired comfortable position above the floor by pulling adjustment straps 115 and securing them using adjustment straps 115. During travel, adjustment can be varied according to the comfort of user 125. User's legs 125 may be lifted high enough so as to flex at knee completely with hip 15 degrees angle or can be lowered and can resume exercise every 30 minutes.

Additionally, the leg supporting device for use behind a head rest equipped seat may be suspended from the dash board or lower part of front window of the passenger seated next to driver side by using an appropriate attachment means such as suction cups that adhere to the window, self-sticking hook and loop fasteners, buckles, etc. This allows the device to be used in configurations lacking a forward positioned head rest. In addition, the device may be used in a side window with appropriate attachment means, as discussed above, to carry reading material, electronics, drinks, computer without cluttering the front part of the passenger seat.

During travel, massage/vibrator 192 placed on the bottom of foot support portion 120 can be turned on. The device helps to exercise the muscles of the feet and legs to counter many ill effects of long sitting in long distance travel. According to known gate theory of pain, vibration helps to reduce pain in the feet and ankles, as the vibrational adds motion to muscles (exercise) and augment the venous circulation in the dependent leg.

A cold and hot pack (not shown) can be used to surround the feet and ankle. It is known that cold helps to reduce pain as the temperature nerves surmount the pain nerves and cold also constricts the blood vessel, thus reducing the venous pooling that can result in blood clot formation.

The vibration device and heating/cold pads can be made to come in contact with the planter surface of the feet to prevent leg swelling and blood clot formation in the depended part of the leg veins. Once the leg are suspended in the foot support portion 120, they can be moved within the bag without any hindrances so as to contract the leg and thigh muscles, and move the joints of the feet, ankle, knees, and thighs with ease resulting in improving the venous circulation and prevent it stagnation which can result in blood clot formation which can result in pulmonary emboli.

Although the instant invention has been described in relation to particular embodiments thereof, many other variations and modifications and other uses will become apparent to those skilled in the art.

What is claimed is:

1. A leg supporting device for use behind a head rest equipped seat comprising:
    a head rest support portion adapted to fit over an adjacent headrest;
    a back flap portion connected to a lower portion of said head rest support portion;
    a foot support portion adapted to support a user's foot;
    an adjustment strap adjustably connected to said back flap portion and said foot support portion wherein the height of said foot support portion is user selectable; and
    said adjustment strap is adjustable by using a hook and loop fastening portion disposed on at least one end of said adjustment strap and a complimentary portion disposed on said foot support portion.

2. The leg supporting device for use behind a head rest equipped seat according to claim 1 further comprising at least one other adjustment strap adjustably connected to said back flap portion and another portion of said foot support portion wherein the height of said foot support portion is user selectable.

3. The leg supporting device for use behind a head rest equipped seat according to claim 2 further comprising at least one pocket disposed on an exposed portion of said back flap portion.

4. The leg supporting device for use behind a head rest equipped seat according to claim 2 further comprising at least one pocket disposed on an inner portion of said foot support portion.

5. The leg supporting device for use behind a head rest equipped seat according to claim 1 further comprising at least one tie down means for securing said back flap portion to a back portion of a head rest equipped seat.

6. The leg supporting device for use behind a head rest equipped seat according to claim 5 wherein said at least one tie down means comprises two straps having a hook and loop fastener portion on each end therein.

7. The leg supporting device for use behind a head rest equipped seat according to claim 1 further comprising a pair of handles disposed on an upper portion of said foot support portion.

8. The leg supporting device for use behind a head rest equipped seat according to claim 1 further comprising a vibration device disposed within said foot support portion.

9. The leg supporting device for use behind a head rest equipped seat according to claim 8 further comprising a remote control for operating said vibration device.

10. The leg supporting device for use behind a head rest equipped seat according to claim 1 further comprising a cooling pack disposed within said foot support portion.

11. The leg supporting device for use behind a head rest equipped seat according to claim 1 further comprising a heating pack disposed within said foot support portion.

12. The leg supporting device for use behind a head rest equipped seat according to claim 1 wherein said head rest support portion is made of an elastic cloth material.

13. The leg supporting device for use behind a head rest equipped seat according to claim 1 wherein said head rest support portion has an elastic band sewn into a bottom perimeter portion therein.

* * * * *